Figure 1:
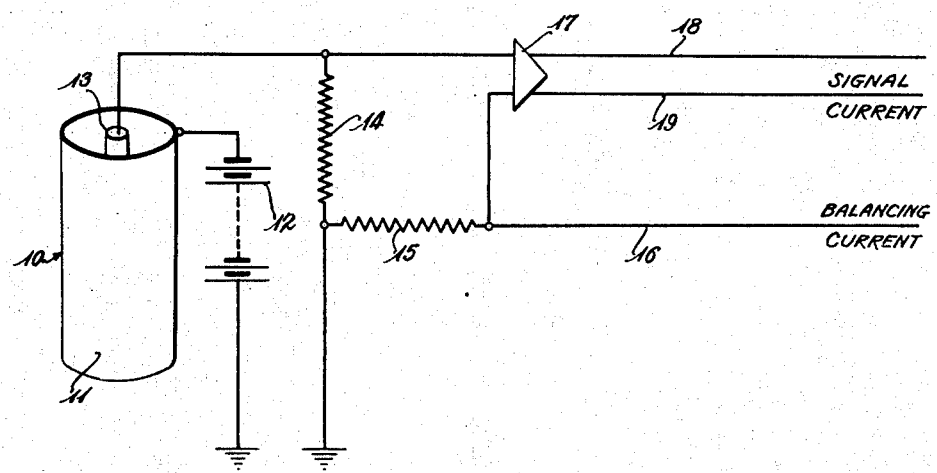

July 14, 1953     R. E. FEARON     2,645,723

METHOD AND APPARATUS FOR INCREASING SPEED OF WELL LOGGING

Filed Feb. 21, 1946

INVENTOR
*Robert E. Fearon*
BY *James Y. Cleveland*
ATTORNEY

Patented July 14, 1953

2,645,723

UNITED STATES PATENT OFFICE 2,645,723

METHOD AND APPARATUS FOR INCREASING SPEED OF WELL LOGGING

Robert Earl Fearon, Tulsa, Okla., assignor to Well Surveys, Incorporated, Tulsa, Okla., a corporation of Delaware Application February 21, 1946, Serial No. 649,348

2 Claims. (Cl. 250—83.6)

This invention relates to the art of measuring radiations and more particularly to the measurement of gamma radiation by an ionization chamber.

In the measurement of gamma radiation by the use of an ionization chamber, and in other similar measurements, it is customary to place a source of potential and a relatively high resistance of, for example, $10^{11}$ ohms, in series across the electrodes of the ionization chamber and then to use the potential drop across the resistor as a measure of the ionization taking place in the ionization chamber. This arrangement is satisfactory in a laboratory where an accurate measurement of the potential developed may be made and sufficient time may be allowed for the ionization chamber-resistor-potential source circuit to come to equilibrium. However, in the field, particularly in such equipment as is used for radioactivity well logging, a limit is found in the speed with which a well can be logged, because it takes a certain interval of time for the ionization chamber-resistor-potential source circuit to come to equilibrium at any given location. A short consideration of the electrical principles involved will show why this is so.

Any circuit having a capacity and a resistance in series has a definite time constant which is proportional to the product of the resistance and the capacity. Since the resistor in the ionization chamber-resistor-potential source circuit must be quite high in order to develop an appreciable potential across it, and the ionization chamber, by the nature of its structure acts as a fairly large capacitance, the time constant of this circuit is quite long. In fact, the efficiency of the ionization chamber could be increased by increasing the area of the electrode surfaces, but this has heretofore been impractical because of its effect in lengthening the time constant of the ionization chamber circuit.

Another problem in well logging has been that of measuring accurately and continuously the potential drop across the resistor and the ionization chamber. This has been found difficult because of the inherent instability of direct current amplifiers which are necessary in order to produce sufficient current to operate a recorder or meter. To a considerable extent, at least, this difficulty has been overcome by converting the direct current potential to an alternating current potential and by using a null system of measurement, as described in Patent No. 2,349,225 issued to Serge A. Scherbatskoy et al. on May 16, 1944.

In accordance with that patent, a potential drop across the ionization chamber resistor is matched by a potential drop in a second resistor which is supplied with current from an external source. Any difference in potential across the ionization chamber resistor and the nulling resistor is converted into alternating current, amplified, and used to adjust the current through the nulling resistor so as to equalize the potentials across the two resistors. The recorder then records the current required to bring the system into balance. By such a system, it is possible to make quite accurate measurements of the potential across the ionization chamber resistor, but the speed of the measuring process is still limited by the time constant of the ionization chamber-resistor-potential source circuit.

In accordance with the principles of this invention, the time constant of a circuit of this latter type, exemplified by the patent to Serge A. Scherbatskoy Number 2,219,274, may be reduced substantially to zero by a very simple alteration.

A study of the reason for the time constant in the ionization chamber-resistor-potential source circuit reveals that a change in potential across the resistor cannot occur any more rapidly than a difference in potential can be built up across the electrodes of the ionization chamber, which acts as a condenser, and that the potential cannot be built up across the electrodes of the ionization chamber any faster than current can flow through the resistor. If it were not necessary to change the potential across the ionization chamber electrodes in order to produce a potential change across the ionization chamber resistor, the time constant would be substantially zero.

In accordance with the principles of this invention, it has been found that the suggested desirable situation can be attained if a second resistor is placed in series with the other elements in the ionization chamber-resistor-potential source circuit and a potential placed across this resistor that is caused, at all times, to be of such magnitude and in such a direction that the potential drop across this second resistor tends to lessen or completely eliminate the changes in potential in the circuit that would otherwise be caused by the changes in current flow that normally occur during operation of the device. If the elimination of potential changes is relatively complete, it is not necessary to build up any appreciable charge across the ionization chamber electrodes when the current flow changes, the ionization chamber ceases to have the effect of a capacitance, and the time constant is greatly decreased. Furthermore, if the potentials of the other parts of the circuit are also maintained relatively constant with respect to each other, the parasitic capacity of these parts is likewise made ineffective to produce time lag.

A system such as is shown in the Scherbatskoy et al. Patents Nos. 2,349,225, and 2,219,274 lend themselves admirably to modification to produce the desired situation. In order to effect the measurement of the potential across the ionization chamber resistor by the null method, a second resistor must be provided and made at all times to carry a current that will produce a potential equal to that in the ionization chamber resistor. By a relatively simple circuit modification, this resistor can be used for its original purpose and at the same time placed in series with the ionization chamber, ionization chamber resistor and power source in such a manner that the potential across it will be placed in the ionization chamber-resistor-potential source circuit in such a way as to stabilize the relative potentials of the various points in that circuit. The immediate result is a great reduction in the time constant of the circuit. This opens the way to greater well logging speed when used in a well logging instrument, and to redesign the ionization chamber to provide larger electrode sufaces and hence more efficient measurements.

While the second resistor may advantageously produce, at all times, a potential drop exactly equal to that of the ionization chamber resistor, it may, at times, be desirable to have it produce a potential proportional to, but either somewhat greater or somewhat less than that produced by the ionization chamber resistor, either to compensate for parasitic resistance and capacity in the circuit or to prevent over-compensation and consequent instability. This may be done, in case it is desired to make the potential across the second resistor greater, by placing additional resistance in the nulling circuit and including both the nulling resistor and the additional resistance as the secondary resistor used for stabilizing the ionization chamber circuit. If the stabilizing potential is to be less than the nulling potential it may be taken from a tap somewhere intermediate the ends of the nulling resistor.

For a more complete understanding of the details of this invention, reference may be had to the appended drawings and the following detailed description thereof.

Figure 2:
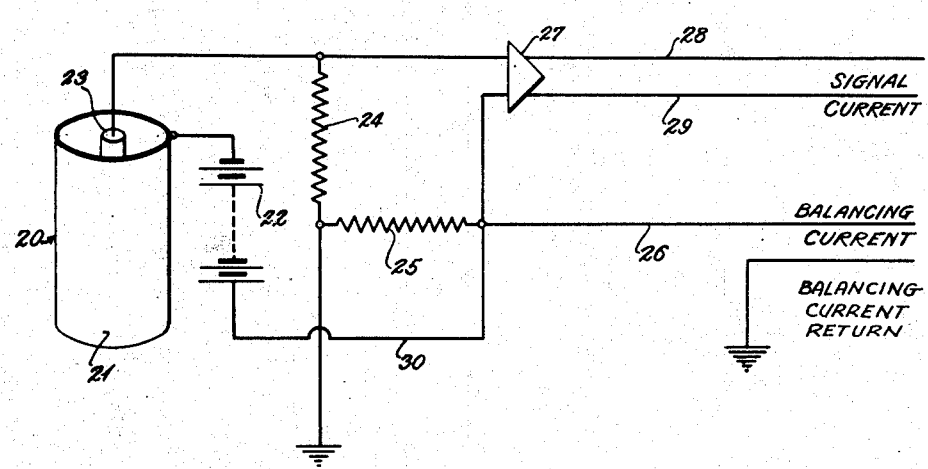

In the drawings:

Figure 1 is a schematic illustration of an ionization chamber circuit and a null system of measurement of the ionization chamber current, the ionization chamber circuit being arranged in the usual way; and Figure 2 is a schematic illustration of the same circuit modified to incorporate the principles of this invention.

In Figure 1, an ionization chamber 10 is connected in the known manner, the outer or cylindrical electrode 11 being connected to the negative pole of a battery 12 the positive pole of which is connected to ground, and the central electrode 13 being connected to one side of a resistor 14, the other side of which is connected to ground. The battery may be of any suitable potential. The resistor is usually of a very high resistance of the order of $10^{11}$ ohms. A balancing resistor 15 also has one side connected to ground and the other side connected to a conductor 16 which supplies sufficient current to the balancing resistor to cause the potential across it to be equal to that across the ionization chamber resistor 14. By connecting an amplifier 17 between the ungrounded sides of the two resistors 14 and 15, any inequality in potentials across the resistors yields a current or potential difference which can be amplified and sent to the recording or observing point by conductors 18 and 19. This will be referred to as the signal current.

At the recording point, which is not shown, the balancing current is continuously adjusted to minimize or reduce to zero the signal current. This is customarily done by automatic equipment and hence takes place very rapidly.

In the Scherbatskoy et al. Patent No. 2,349,225, the equipment which amplifies and sends to the surface the signal current comprises a relatively complex circuit and assembly of equipment. Such a circuit may be used in accordance with the principles of this invention, but it is not necessary to show the circuit in detail in order to illustrate the principles of this invention and hence it has not been done.

In the circuit shown in Figure 1, even though the remainder of the circuit acts instantaneously, the speed at which observations or records can be made is limited by the time required for the ionization chamber-battery-resistor circuit to come to equilibrium. Until the circuit does come to equilibrium, the ionization resistor 14 will not develop its ultimate potential. Since the resistor 14 is of relatively high resistance and there is relatively a large capacity effect present in the ionization chamber 10, the time constant has been found in practice to be unduly long.

As illustrated in Figure 2, by using exactly the same equipment but by one slight modification in the circuit, the time constant of the ionization chamber-battery-resistor circuit may be reduced to a small value, and this very much increases the speed of observation or recording of the phenomena being measured and hence is of importance.

As illustrated in Figure 2, an ionization chamber 20 has its outer electrode 21 connected to the negative pole of the battery 22 and its central electrode 23 connected to one side of a high resistance resistor 24 the other side of which is connected to ground. A balancing resistor 25 has one end connected to ground and the other end connected to a conductor 26 which furnishes it with balancing current exactly as before. An amplifier 27 is connected between the ungrounded ends of the resistors 24 and 25 and sends a signal current to the recording or observing point through conductors 28 and 29.

The only thing that is different from the circuit shown in Figure 1 is that the positive end of the ionization chamber battery 22 is connected by connector 30 to the ungrounded end of the balancing resistor 25. When the circuit is in balance the potential at the ungrounded end of the balancing resistor 25 will always be the same as that at the ungrounded end of the ionization chamber resistor 24. Hence the potential across the ionization chamber electrodes 21 and 23 will at all times be equal to the potential developed across the battery 22 and will not vary with variations in potential of the central electrode 23 with respect to ground. By thus maintaining a constant potential across the ionization chamber, regardless of the current flow to it, it will be unnecessary for any additional charge to build up on the electrodes on the ionization chamber in order to register a difference in potential across the ionization chamber resistor. This will eliminate the time lag that has been found to slow down the process of recording or observing the measurements.

Because of the time constant of the ionization chamber-battery-resistor circuit it has heretofore been impractical to increase the surface area of the electrodes of the ionization chamber, but with this time constant eliminated or greatly reduced it will be possible to increase the surface area of the electrodes of the ionization chamber and hence to obtain more efficient measurement without a corresponding decrease in the speed of measurement.

What is claimed is:

1. An ionization chamber circuit that comprises an ionization chamber, a primary resistor, a secondary resistor and a source of potential all connected in series, variable current supplying means connected across said secondary resistor to induce therein a potential opposite to that in said primary resistor, means for amplifying any difference in potential existing across said primary and secondary resistors, and means for varying the current supplied by the variable current supplying means in accordance with the amplified potential difference, to effect a balancing of the potentials across the primary and secondary resistors and thus maintain a substantially constant potential across said ionization chamber regardless of the amount of current flowing therethrough.

2. In a well surveying device that includes an ionization chamber and attendant circuits adapted to be lowered into a drill hole, and recording apparatus adapted to be located on the surface of the earth and electrically connected to the ionization chamber circuit in the drill hole, the improvement that comprises an ionization chamber circuit which includes an ionization chamber, a primary resistor, a secondary resistor and a source of potential all connected in series and adapted to be lowered into the drill hole with the ionization chamber, variable current supplying means adapted to be located on the surface of the earth and connected across said secondary resistor to induce therein a potential opposite to that in said primary resistor, means adapted to be located in the drill hole adjacent the ionization chamber for amplifying any difference in potential existing across said primary and secondary resistors, and means adapted to be located on the surface of the earth for varying the current applied by said variable current supplying means in accordance with the amplified potential difference, to effect a balancing of the potentials across the primary and secondary resistors and thus maintain a substantially constant potential across said ionization chamber regardless of the amount of current flowing therethrough.

ROBERT EARL FEARON.

References Cited in the file of this patent

UNITED STATES PATENTS

| Number | Name | Date |
| --- | --- | --- |
| 2,219,274 | Scherbatskoy | Oct. 22, 1940 |
| 2,349,225 | Scherbatskoy et al. | May 16, 1944 |
| 2,465,938 | Shonka | Mar. 29, 1949 |
| 2,536,617 | Weller | Jan. 2, 1951 |